March 21, 1933. T. H. THOMAS 1,901,937
FLUID PRESSURE BRAKE
Filed May 22, 1929
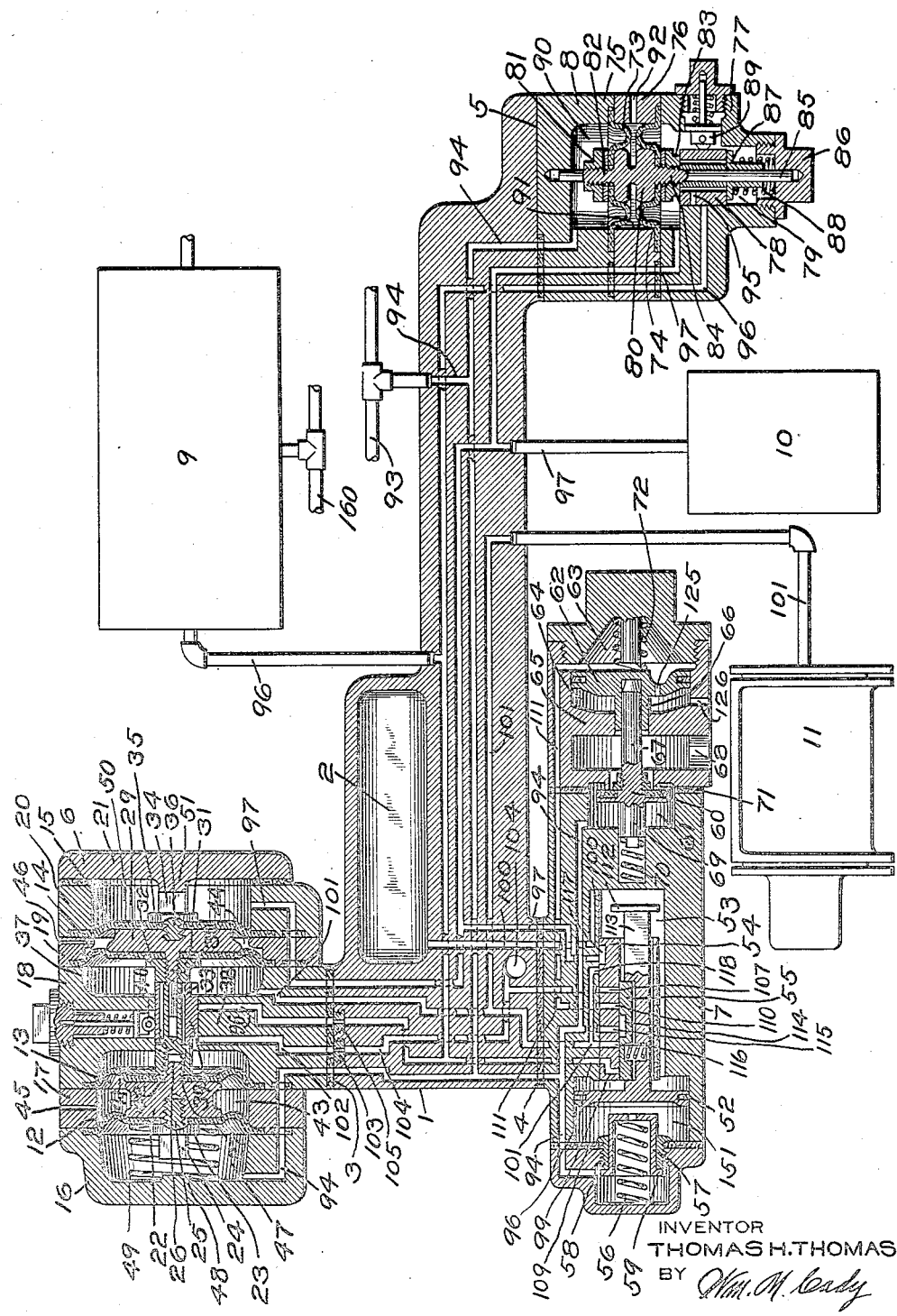
INVENTOR
THOMAS H. THOMAS
BY *Wm. M. Cady*
ATTORNEY

UNITED STATES PATENT OFFICE

THOMAS H. THOMAS, OF EDGEWOOD, PENNSYLVANIA; MABEL M. THOMAS, EXECUTRIX OF SAID THOMAS H. THOMAS, DECEASED, ASSIGNOR TO THE WESTINGHOUSE AIR BRAKE COMPANY, OF WILMERDING, PENNSYLVANIA, A CORPORATION OF PENNSYLVANIA.

FLUID PRESSURE BRAKE

Application filed May 22, 1929. Serial No. 365,027.

This invention relates to fluid pressure brakes and more particularly to a valve mechanism for controlling the brakes on a car in a train.

In the usual fluid pressure brake equipment employing a brake pipe, auxiliary reservoir, brake cylinder and triple valve device, the fluid under pressure for charging the auxiliary reservoir is supplied through the brake pipe and a feed groove around the triple valve piston when the brakes are being released, and when the brakes are being applied, there is often a slight back flow of fluid under pressure from the auxiliary reservoir to the brake pipe through said feed groove. It is thus obvious that a considerable amount of fluid under pressure is transmitted through the brake pipe in applying and releasing the brakes, which tends to retard the operation of the triple valve device.

One object of my invention is to provide an improved valve mechanism, for controlling the brakes on a car, in which the above difficulty is obviated.

Other objects and advantages will appear in the following more detailed description of my invention.

In the accompanying drawing, the single figure is a diagrammatic view, partly in section, of a fluid pressure brake equipment embodying my invention.

As shown in the drawing, the brake equipment includes a controlling valve device comprising a bracket 1, having a chamber 2 and provided with three faces, 3, 4 and 5 upon which are mounted a service application valve device 6, an emergency application valve device 7, and a check valve device 8, respectively. The equipment also comprises a main reservoir 9, a service application valve control reservoir 10 and a brake cylinder 11.

Connected to the main reservoir 9 is a pipe 160 which may extend throughout the length of a train and which may be connected to the main reservoir 9 of each car. Through this pipe the pressures in the main reservoirs are adapted to be maintained equal.

The service application valve device 6 comprises a casing divided into sections 17, 18, 19 and 20. Interposed between the section 17 and a cover plate 16 is a flexible diaphragm 12, and interposed between the casing sections 17 and 18 is a flexible diaphragm 13. At the opposite side of casing section 18 a flexible diaphragm 14 is interposed between said section and the casing section 19, and still another diaphragm 15 is interposed between the section 19 and the casing section 20, a cover plate 21 being mounted on the opposite side of the section 20.

Interposed between diaphragms 12 and 13 is a follower plate 22, the first mentioned diaphragm being clamped against said follower plate by a shoulder 23 on a cap screw 24, which has a centrally disposed screw-threaded portion 25 engaging said follower. The follower plate 22 has a screw-threaded portion 26 extending through the diaphragm 13 and engaging a stem 27, one end of which is adapted to clamp the diaphragm 13 against the follower plate 22, thereby securing the diaphragms 12 and 13 together.

A follower plate 29 is interposed between the diaphragms 14 and 15 and has a screw-threaded stem 30 extending through the diaphragm 14. Mounted on the stem 30 is a nut 31 having a flange 32 which clamps diaphragm 14 against the follower plate 29. An extension 33 of the screw threaded stem 30 slidably projects into a suitable bore in the stem 27, so as to permit relative movement between the diaphragms clamped to the follower plates 22 and 29.

A cap screw 34, having a flange 35, has a screw threaded stem 36 extending through the diaphragm 15 and engaging the follower plate 29 thereby securing the diaphragm 15 to said follower plate, so that the diaphragms 14 and 15 operate together.

Integral with the casing section 18 and extending upwardly in the chamber 37 is a lug 38, the upper face of which forms a seat for a slide valve 39 operatively mounted between a shoulder on the diaphragm stem 27 and the head of diaphragm nut 31. The slide valve 39 is maintained seated by a spring pressed plunger 40, contained in a cavity in a depending lug 41 and, engaging the upwardly extending wing portion 42 of said slide valve.

Chambers 43 and 44 are formed between diaphragms 12 and 13, and 14 and 15 and are permanently in communication with the atmosphere through passages 45 and 46 respectively.

The casing cover plate 16 is provided with a stop lug 48 adapted to be engaged by the head of the cap screw 24, so as to limit the deflection of the diaphragms 12 and 13 to the left. The chamber 47 at the outer face of diaphragm 12 contains a spring 49, which engages diaphragm 12, urging said diaphragm to the right.

The casing cover plate 21 is provided with a stop lug 51 adapted to be engaged by the head of the cap screw 34, so as to limit the deflection of diaphragms 14 and 15 to the right.

The emergency valve device 7 of the brake equipment comprises a quick action portion and a vent valve portion.

The quick action portion of the emergency valve device comprises a casing having a chamber 151 containing a piston 52 and a chamber 53 containing a main slide valve 54 and an auxiliary slide valve 55, adapted to be operated by said piston. A spring 56 is contained in the chamber 151 and acts against a retaining member 57 slidably mounted in a nut 58 having screw-threaded engagement in the casing. Movement of the member 57 to the right is limited by the engagement of a flange 59 on said member with the outer end of the nut 58.

The vent valve portion of the emergency valve device comprises a brake pipe vent valve 60 contained in a chamber 61 and a piston 62 for operating said vent valve. The piston 62 has a chamber 63 at one side and a chamber 64 at the opposite side, and slidably mounted in a suitable bore in the partition wall 65 of the casing is a stem 66 of said piston.

The vent valve 60 has a stem 67 extending into a bore in stem 66 of the piston 62. The vent valve 60 also has a stem 69 at the opposite side extending into a bore in the casing, said bore containing a spring 70 acting on said stem and urging said valve to a seat rib 71. Contained in chamber 63, at one side of the piston 62, is a spring 72 for maintaining said piston in engagement with the vent valve stem 67.

The check valve portion 8 comprises a casing divided into sections 75, 76 and 77. Interposed between the sections 75 and 76 is a flexible diaphragm 73 and interposed between the opposite side of section 76 and the section 77 is a flexible diaphragm 74. A slide valve 78 is contained in a chamber 79 formed at one side of the diaphragm 74 and within the casing section 77 and is adapted to be operated by deflection of said diaphragms. Said diaphragms are separated by a spacer 80 to which diaphragm 73 is clamped by a nut 81 having screw-threaded engagement on a stem 82 of said spacer. Diaphragm 74 is secured to said spacer by a nut 83 having screw-threaded engagement on another stem 84 of said spacer. The stem 84 has an extension 85 projecting downwardly and slidably mounted in a suitable bore in a cap screw 86, which screw is adapted to close one end of the chamber 79. Slidably mounted on the stem extension 85 is a flanged sleeve-like member 87 and interposed between said member and the cap screw 86 is a spring 88. Mounted between the flange on member 87 and the nut 83 is the slide valve 78, which is maintained seated by a spring pressed plunger 89.

A chamber 90 is formed at the upper side of the diaphragm 73, and a chamber 91, formed intermediate the diaphragm 73 and 74, is in constant communication with the atmosphere by way of a passage 92.

In operation, fluid under pressure is supplied to the brake pipe 93 by the operation of a brake valve device (not shown) in the usual well known manner. Fluid from the brake pipe 93 flows through passage 94 to diaphragm chamber 47 of the service application valve device 6, piston chamber 151 of the emergency valve device 7 and diaphragm chamber 90 of the check valve device 8.

With the diaphragm chambers 37 and 50 of the service application valve device 6 initially at atmospheric pressure, the pressure of fluid in chamber 47 deflects the diaphragms 12, 13, 14 and 15 to the right until cap nut 34 engages stop 51. The pressure of fluid in the emergency piston chamber 151 forces the piston 52 and slide valves 54 and 55 to their extreme inner position, in which said piston engages the casing, and the pressure of fluid in diaphragm chamber 90 of the check valve device deflects the diaphragms 73 and 74 downwardly, thereby shifting the slide valve 78 downwardly to a position in which a port 95 in said slide valve registers with a passage 96.

Fluid under pressure from a main reservoir 9, which is charged with fluid under pressure in the usual manner, flows through pipe and passage 96 to the seat of the service application slide valve 39, to the seat of the emergency slide valve 54 and to the seat of the slide valve 78 in the check valve device.

With the slide valve 78 of the check valve device 8 shifted downwardly, as hereinbefore described, fluid at main reservoir pressure flows from passage 96 through port 95 in said slide valve to valve chamber 79 and from thence through passage and pipe 97 to the control reservoir 10, to the diaphragm chamber 50 of the service application valve device and to the seat of the emergency slide valve 54.

When the pressure in diaphragm chamber 79 of the check valve device becomes equal to or slightly greater than the brake pipe pressure acting in diaphragm chamber 90, then the diaphragms 73 and 74 are deflected upwardly, permitting spring 88 to shift slide valve 78 upwardly and lap passage 96, so as to prevent further flow of fluid under pressure from the main reservoir to the control reservoir 10.

With the diaphragm chamber 50 of the service application valve device 6 charged with fluid at substantially the same pressure as that carried in the brake pipe 93 and acting in diaphragm chamber 47, the pressure of the spring 49 maintains the service application valve device in the normal running position, as shown in the drawing.

As hereinbefore described, brake pipe pressure acting in chamber 151 of the emergency valve device causes the piston 52 to shift the slide valves 54 and 55 to their extreme inner position, in which a port 99 in the main slide valve 54 registers with passage 96 from main reservoir 9, and port 99 is uncovered by the auxiliary slide valve 55. Fluid under pressure is thus permitted to flow from the reservoir 9 into valve chamber 53 and from thence through a passage 100 to the quick action chamber 2. When the pressure in the quick action chamber and valve chamber 53 thus becomes slightly greater than the brake pipe pressure acting in the piston chamber 151, the piston 52 is shifted to the left, causing the auxiliary slide valve 55 to move relative to the main slide valve 54 and thereby lap port 99, so as to prevent further flow of fluid under pressure to said chambers. After the port 99 is thus lapped, the piston 52 continues to move to the left, and as the volume of the valve chamber 53 increases, the pressure in said chamber correspondingly reduces, and when the pressure in said chamber has thus been reduced to substantially brake pipe pressure acting on the opposite side of the piston, further movement of the piston toward the left ceases, and the piston remains in a position, as shown in the drawing.

With the equipment thus fully charged, the brake cylinder 9 is connected to the atmosphere through pipe and passage 101, diaphragm chamber 37 of the service application valve device, passage 102 which is uncovered by slide valve 39, a choke plug 103 and an atmospheric passage 104.

If it is desired to effect a service application of the brakes, the pressure of the fluid in the brake pipe 93 is gradually reduced in the usual manner. Since diaphragm chamber 47 of the service application valve device is connected to the brake pipe, the pressure therein is also reduced a corresponding degree.

As hereinbefore described, the valve chamber 37 intermediate diaphragms 13 and 14, is normally at atmospheric pressure due to the atmospheric connection by way of passage 102, and the diaphragm chamber 50 is charged with fluid substantially equal to the brake pipe pressure effective in the diaphragm chamber 47. Thus, when the brake pipe pressure in diaphragm chamber 47 is reduced below the pressure in diaphragm chamber 50, the pressure in chamber 50 acting on diaphragm 15 causes said diaphragm to operate and deflect the other diaphragms 12, 13 and 14 to the left, thereby shifting the slide valve 39 to service position, in which passage 102 is lapped and passage 96 from the main reservoir 9 is uncovered. Fluid under pressure thus is permitted to flow from said reservoir to diaphragm chamber 37 through a choke plug 105 in passage 96, and from chamber 37 through passage and pipe 101 to brake cylinder 11, thereby applying the brakes.

The brake cylinder pressure effective in chamber 37 of the service application valve device acts on the left side of diaphragm 14 and on the right side of diaphragm 13. The diaphragm 14 is larger in area than the diaphragm 13, so that the difference in opposing forces on said diaphragms 13 and 14 tends to deflect all of the diaphragms and shift the slide valve 39 to the right. When the difference in pressure acting on the diaphragms 13 and 14 thus becomes sufficient to slightly overbalance the difference between the pressure in diaphragm chamber 50 acting on diaphragm 15 and the reduced brake pipe pressure in diaphragm chamber 47 acting on diaphragm 12, the diaphragms are deflected to the right, thereby causing the slide valve 39 to be shifted and lap the fluid pressure supply passage 96, so as to prevent further flow of fluid under pressure to the brake cylinder.

It is obvious from the above description of the operation of the service application valve device in effecting a service application of the brakes, that the degree of brake cylinder pressure obtained depends upon the degree of brake pipe reduction effected. Consequently, the brake pipe pressure may be reduced in steps and the brake cylinder pressure will build up in proportional steps, thereby effecting a graduated application of the brakes.

When the brake pipe pressure is gradually reduced in effecting a service application of the brakes, such reduction being effective in piston chamber 151 of the emergency valve portion permits the pressure of fluid in the valve chamber 53 to shift the emergency piston 52 and auxiliary slide valve 55 to the left into engagement with the stop member 57. In this position, the brake pipe passage 94 is connected to passage 101 through ports 115 and 116 in the main slide valve 54 and cavity 114 in the auxiliary slide valve 55, thereby permitting fluid under pressure to flow from the brake pipe to the brake cylinder and effect a quick service reduction in brake pipe pressure in the usual well known manner. In this position of the auxiliary slide valve 55, a port 107 in the main slide valve 54 is uncovered, which port registers with the atmospheric passage 104 in the main slide valve seat. Fluid under pressure in the valve chamber 53 and quick action chamber 2 is thus permitted to flow to the atmosphere at a rate substantially equal to the rate of reduction in brake pipe pressure. When the pressure in valve chamber 53 is thus reduced to a degree slightly less than the reduced brake pipe pressure, then the piston 52 shifts the auxiliary slide valve 55 back to its normal position.

In order to release the brakes after a service application, the brake pipe 93 is recharged with fluid under pressure. When the brake pipe pressure is thus increased, causing a corresponding increase in pressure in diaphragm chamber 47 of the service application valve device, the pressure acting on the left side of diaphragm 12 plus the brake cylinder pressure acting on the left side of diaphragm 14 overbalances the pressure acting on the right hand sides of diaphragms 13 and 15 and causes the diaphragms 12, 13, 14 and 15 to be deflected to the right, thereby shifting the slide valve 39 to the right and uncovering passage 102, through which fluid under pressure is vented from the brake cylinder 11 to the atmosphere by way of pipe and passage 101, valve chamber 37, passage 102, choke plug 103 and atmospheric passage 104, thereby releasing the brakes.

In releasing a service application of the brakes, the emergency valve portion is shifted to its extreme right hand position in which the valve chamber 53 and quick action chamber 2 are recharged in the same manner as in initially charging the equipment.

If it is desired to effect an emergency application of the brakes, the brake pipe pressure is suddenly reduced, thereby effecting a sudden reduction in pressure in the diaphragm chamber 47 of the service application valve device 6, permitting the pressure in the diaphragm chamber 50 to deflect the diaphragms 12, 13, 14 and 15 to the left, thereby shifting the slide valve 39 and permitting fluid under pressure to flow from the main reservoir 9 to the brake cylinder 11 in the same manner as when a service application of the brakes is effected.

The sudden reduction in brake pipe pressure reduces the pressure in the emergency piston chamber 151, thereby permitting the pressure in valve chamber 53 to shift the emergency piston 52 and slide valves 54 and 55 to the extreme left, compressing spring 56 and causing the piston 52 to seal against the gasket 109. The piston 52 and graduating valve 55 do not stop in their service position, as when a service application of the brakes is effected, since the rate of reduction in piston chamber 151 is greatly in excess of the venting capacity of the port 107 in the main slide valve 54, and the necessary difference in pressure to shift said piston and slide valves to emergency position is therefore maintained on the opposite sides of said piston.

As the emergency piston 52 moves to emergency position, the graduating valve 55 initially uncovers port 107 and a port 110 in the main slide valve, thereby permitting fluid under pressure from the valve chamber 53 and quick action chamber 2 to flow through port 107 and passage 104 to the atmosphere, and through port 110 and passage 111 to the vent valve piston chamber 63 for a reason to be hereinafter explained. As the piston 52 continues to move toward emergency position, the main slide valve 54 is engaged by the flange 112 at the end of piston stem 113, and is thereby also moved to the left to emergency position, in which port 107 is disconnected from the atmospheric passage 104 and connected to passage 111, so that fluid under pressure continues to flow to the vent valve piston chamber 63.

Fluid under pressure thus supplied to vent valve piston chamber 63, shifts the piston 62 to the left, thereby unseating the brake pipe vent valve 60, which permits fluid under pressure to be suddenly vented from the brake pipe 93 to the atmosphere through passage 94, vent valve chamber 61, past vent valve 60 and from thence through the atmospheric chamber 68, so as to transmit serially the sudden emergency reduction in brake pipe pressure, in the usual manner.

In emergency position of the slide valve 54 the atmospheric passage 104 is lapped, so that the fluid under pressure in valve chamber 53 and quick action chamber 2 is only vented to the quick action piston chamber 63, from whence it flows to the atmosphere through a port 125 in the quick action piston 62 and an atmospheric passage 126. By thus venting fluid under pressure only through the port 125, the piston 62 maintains the vent valve 60 unseated for a period of time sufficient to completely vent the fluid under pressure from the brake pipe.

With the emergency piston 52 and slide valves 54 and 55 in emergency position, a cavity 114 in the graduating valve 55 connects ports 115 and 116 in the main slide valve 54. The port 116 registers with passage 96 from the main reservoir 9 and the port 115 registers with passage 101 from the brake cylinder 11, so that fluid under pressure is permitted to flow from the main reservoir to the brake cylinder by way of said cavity 114. In emergency position of the emergency portion, the control reservoir 10 is also connected to the brake cylinder 11 through pipe and passage 97, a cavity 117 in the main slide valve 54, a passage 118 and passage and pipe 101.

It will be noted that when an emergency application of the brakes is effected, both the main reservoir 9 and control reservoir 10 are connected to the brake cylinder, so that a high brake cylinder pressure is obtained, whereas when a service application of the brakes is effected, a brake cylinder pressure proportional to the brake pipe reduction, as governed by the operation of the service application valve device 6, is obtained. Moreover, the rate of build up of brake cylinder pressure in an emergency application is much faster than in a service application, since fluid under pressure is supplied to the brake cylinder by the operation of both the service application valve device 6 and emergency valve device 7.

It will further be noted that the propagation of quick serial venting of fluid under pressure from the brake pipe 93 to the atmosphere is hastened, by permitting fluid under pressure to flow to the vent valve piston chamber 63 before the main slide valve 54 is moved, by way of port 110 in said slide valve and passage 111. This is an advantage, in that when the emergency piston stem flange 112 engages the main slide valve 54, there will be a slight hesitation before the main slide valve is moved, in order to obtain a greater difference in pressure on the opposite sides of the emergency piston 52, as required to move said slide valve. Thus, during this hesitation, the vent valve piston chamber 63 is partly charged with fluid under pressure, so that when the main slide valve is moved to emergency position the vent valve will be operated at once. There is another advantage in supplying fluid under pressure to the vent valve piston chamber 63 without shifting the main slide valve from its normal position, as for instance, if the main slide valve fails to move, still the brake pipe vent valve 60 will be operated to suddenly reduce the brake pipe pressure in order to propagate the emergency action as hereinbefore described.

If for any reason, the control reservoir 10 becomes charged with fluid at a pressure greater than the pressure carried in the brake pipe, then that pressure acting in diaphragm chamber 50 of the service application valve device will cause the brakes to be applied in a degree proportional to the amount of overcharge or the difference in pressure in said reservoir and in the brake pipe. This is obvious since it is the same as if the brake pipe pressure were reduced an amount equal to the degree of overcharge.

In case the control reservoir 10 does become overcharged, then in order to reduce the pressure in said reservoir, an emergency application of the brakes is effected in the same manner as hereinbefore described. The control reservoir 10 is thereby connected to the brake cylinder 11 through the emergency portion 7 and the pressure in said reservoir reduces by flow to the brake cylinder 11. The brakes may then be released and the control reservoir will then recharge to the pressure to be carried in the brake pipe.

It will be noted that the brake pipe 93 is only a medium through which fluid under pressure is supplied to or vented from the service application valve device diaphragm chamber 47, emergency piston chamber 51 and check valve diaphragm chamber 90, and as the combined volumes of the brake pipe and said chambers may be quite small, the pressure of the fluid therein may be varied rapidly in order to expedite the application and release of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, brake cylinder, and a main reservoir, of a control reservoir, a valve mechanism subject to the opposing pressures of the brake pipe and said control reservoir for supplying fluid under pressure from the main reservoir to said control reservoir and for maintaining the pressure in said control reservoir constant except in emergency, and a valve device subject to the opposing pressures of the brake pipe and said control reservoir for controlling the supply of fluid under pressure to the brake cylinder.

2. In a fluid pressure brake, the combination with a brake pipe, brake cylinder, and a main reservoir, of a control reservoir, a valve mechanism subject to the opposing pressures of the brake pipe and said control reservoir for supplying fluid under pressure from the main reservoir to said control reservoir, and a valve device subject to the opposing pressures of the brake pipe and said control reservoir and operated upon a reduction in brake pipe pressure for supplying fluid under pressure from the main reservoir to the brake cylinder.

3. In a fluid pressure brake, the combination with a brake pipe and a main reservoir, of a valve device comprising a movable abutment subject to the opposing pressures of the brake pipe and a chamber, valve means operated by said abutment upon an increase in brake pipe pressure for supplying fluid under pressure from the main reservoir to said chamber and upon an increase in pressure in said chamber for cutting off the supply of fluid from the main reservoir to said chamber, and upon a gradual reduction in brake pipe pressure for venting fluid under pressure from said chamber to the atmosphere.

4. In a fluid pressure brake, the combination with a brake pipe, of a valve device subject to brake pipe pressure and the pressure in a chamber for controlling the brakes on a train, a main reservoir, valve means governed by the pressure in said brake pipe and operative to supply fluid under pressure from said main reservoir to said chamber and another valve device operative upon a reduction in brake pipe pressure to vent fluid under pressure from said chamber.

5. In a fluid pressure brake, the combination with a brake pipe, of a valve device subject to brake pipe pressure and the pressure in a chamber for controlling the brakes on a train, a main reservoir, valve means governed by the pressure in said brake pipe and operative to supply fluid under pressure from said main reservoir to said chamber, a brake cylinder, and means operative upon a reduction in brake pipe pressure to vent fluid under pressure from said chamber to said brake cylinder.

6. In a fluid pressure brake, the combination with a brake pipe, a main reservoir and a quick action chamber adapted to be supplied with fluid under pressure from the main reservoir, of a valve device subject to the opposing pressures of said brake pipe and chamber and normally closing communication through which fluid under pressure is supplied from the main reservoir to said chamber and movable from its normal position upon an increase in brake pipe pressure for opening communication through which fluid under pressure is supplied from the main reservoir to said chamber.

7. In a fluid pressure brake, the combination with a brake pipe, a main reservoir and a quick action chamber adapted to be supplied with fluid under pressure from the main reservoir, of a valve device subject to the opposing pressures of said brake pipe and chamber and normally closing communication through which fluid under pressure is supplied from the main reservoir to said chamber and movable from its normal position upon an increase in brake pipe pressure for opening communication through which fluid under pressure is supplied from the main reservoir to said chamber and movable upon an increase in pressure in said chamber for closing off the supply of fluid under pressure from the main reservoir to said chamber.

8. In a fluid pressure brake, the combination with a brake pipe, a main reservoir and a quick action chamber adapted to be supplied with fluid under pressure from the main reservoir, of a valve device for controlling the supply of fluid under pressure to said chamber, said valve device comprising a main valve having a port through which fluid under pressure is adapted to be supplied from the main reservoir to said chamber, an auxiliary valve normally closing off the flow of fluid under pressure through said port, and a movable abutment subject to the opposing pressures of the brake pipe and chamber and normally maintaining said auxiliary valve in its normal position and operative upon an increase in brake pipe pressure for shifting said auxiliary valve to open communication through said port to said chamber.

In testimony whereof I have hereunto set my hand, this 20th day of May, 1929.

THOMAS H. THOMAS.